United States Patent
Van Schyndel (10) Patent No.: US 6,829,549 B2
(45) Date of Patent: Dec. 7, 2004

(54) IMPLEMENTATION OF A POST DETECTION CHROMATIC DISPERSION COMPENSATION TRANSFER FUNCTION

(75) Inventor: Andro Van Schyndel, Kanata (CA)

(73) Assignee: Nortel Networks Limited, St. Laurent (CA)

(*) Notice: Subject to any disclaimer, the term of this patent is extended or adjusted under 35 U.S.C. 154(b) by 268 days.

(21) Appl. No.: 10/242,348

(22) Filed: Sep. 11, 2002

(65) Prior Publication Data

US 2003/0112496 A1 Jun. 19, 2003

Related U.S. Application Data

(63) Continuation-in-part of application No. 10/022,666, filed on Dec. 17, 2001.

(51) Int. Cl.[7] .............................. G06F 19/00; H01S 3/00
(52) U.S. Cl. ...................................... 702/85; 359/337.5
(58) Field of Search ...................... 702/85; 359/337.5; 385/3; 332/145

(56) References Cited

U.S. PATENT DOCUMENTS 5,638,439 A * 6/1997 Kawada et al. ........ 379/406.08
5,949,926 A * 9/1999 Davies ......................... 385/3
5,999,289 A * 12/1999 Ihara et al. ................. 398/147
6,388,785 B2 * 5/2002 Havstad et al. ............. 398/158
6,487,352 B1 * 11/2002 Sobiski et al. .............. 385/122
6,522,439 B2 * 2/2003 Price et al. ................. 398/194
6,633,704 B2 * 10/2003 Kohnke et al. ............... 385/39

* cited by examiner

Primary Examiner—John Barlow
Assistant Examiner—Toan M. Le
(74) Attorney, Agent, or Firm—Mintz, Levin, Cohn, Ferris, Glovsky & Popeo, P.C.

(57) ABSTRACT

A method and apparatus for compensating, in the electrical domain, for chromatic dispersion of an optical signal is disclosed. An optical signal is converted to an electrical signal comprised of components which are recoverable and components which are not directly recoverable. A first approximation of the output is derived by applying a transfer function to the electrical signal. The components of the electrical signal which are not directly recoverable are then estimated by applying a second transfer function to the first approximation. After removing these components a second approximation of the output is obtained by re-applying the first transfer function to the result. The optical signal may have a suitably small extinction ratio to improve compensation. The square root of the electrical signal may be taken to improve compensation. A better approximation may be achieved by re-applying the above method iteratively.

20 Claims, 8 Drawing Sheets

IMPLEMENTATION OF A POST DETECTION CHROMATIC DISPERSION COMPENSATION TRANSFER FUNCTION

This application is a continuation-in-part of U.S. patent application Ser. No. 10/022,666 filed Dec. 17, 2001.

SUMMARY OF THE INVENTION

This invention relates to chromatic dispersion compensation, but more particularly to compensation of chromatic dispersion, which is performed post detection in the electrical domain.

BACKGROUND OF THE INVENTION

With the advent of optical amplifiers, which can compensate for fibre loss, the reach of fiber systems, especially at 10 Gb/s and beyond, is limited by chromatic dispersion. Chromatic dispersion causes different parts of the signal spectrum to arrive at the distant end of the system at different times. An optical signal carrying information has a bandwidth spread related to the modulation of the optical carrier.

In the time domain, the dispersion can cause pulses to interfere with each other. This is known as inter-symbol interference or ISI. The dominant cause of chromatic dispersion is material dispersion, the variation in the refractive index versus wavelength of silica, the basic material from which all low loss transmission fibers are made. Ideally, chromatic dispersion is a reversible process. Optical dispersion compensation requires an element, which can produce a delay versus frequency characteristic equal and opposite to that of the fiber. It may be optically compensated either by using special dispersion shifted transmission fiber in the transmission path or by localized dispersion compensation. In the case of the dispersion shifted transmission fiber, a length of this highly dispersive fiber is inserted between the end of the channel and a PIN diode detector to add a frequency dependent delay opposite to that applied by the fiber in the channel. Unfortunately, the problem with this method is that it also introduces attenuation, it requires complex measurements and trained personnel for installation and is not adjustable once installed. Other methods include stretchable chirped Fiber Bragg Gratings (FBGs), Arrayed Waveguide Gratings (AWGs) and tunable Fabry Perot interferometers. Unfortunately, these methods have limited bandwidths, demand higher power levels, have slow and limited adaptation and are expensive.

Although efforts have been made to develop fully optical networks including photonic switching devices, the effects caused by chromatic dispersion and the solutions used to date have hampered their introduction since compensating devices have to be tailored to the specific length of fiber channel being used. Any changes due to network re-configuration or other changes require additional measurements and re-installation of chromatic dispersion compensating equipment.

A need therefore exists for a chromatic dispersion compensation process, which overcomes the shortcomings associated with the current compensation methods.

SUMMARY OF THE INVENTION

According to a first aspect of the invention, there is provided a method and apparatus for compensating, in the electrical domain, for chromatic dispersion of an optical signal An optical signal is converted to an electrical signal comprised of components which are recoverable and components which are not directly recoverable. A first approximation of the output is derived by applying a transfer function to the electrical signal. The components of the electrical signal which are not directly recoverable are then estimated by applying a second transfer function to the first approximation. After removing these components a second approximation of the output is obtained by re-applying the first transfer function to the result. A better approximation may be achieved by re-applying the above method iteratively. According to another aspect of the invention, the optical signal may have a suitably small extinction ratio to improve compensation. The square root of the electrical signal may be taken to improve compensation.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention and its embodiments thereof will be described in conjunction with the accompanying drawings in which.

DETAILED DESCRIPTION OF THE PREFERRED EMBODIMENT

Figure 1:
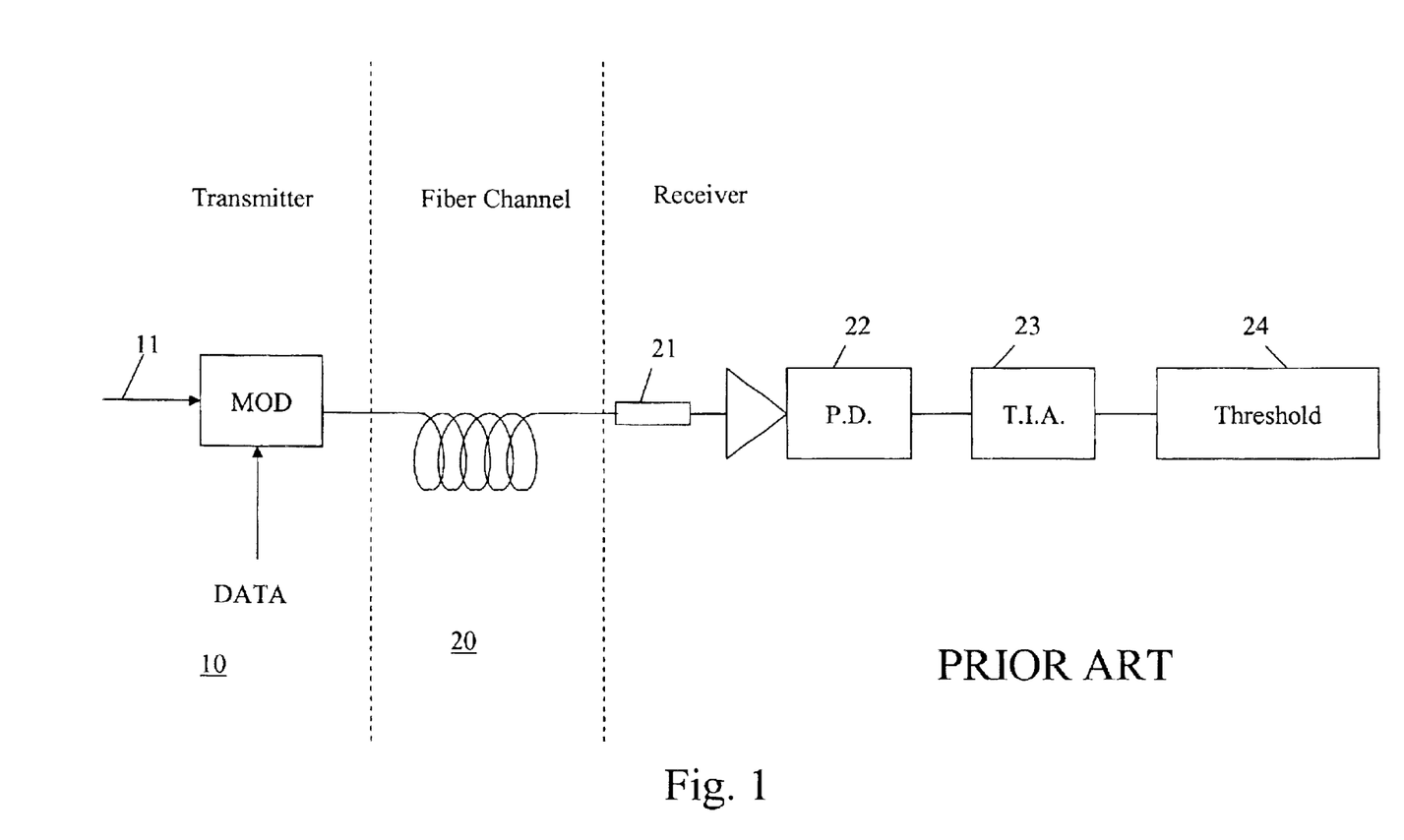
FIG. 1 is a block diagram illustrating a chromatic dispersion compensation technique used in the prior art.

Referring now to FIG. 1, we have shown a block diagram illustrating a method of compensating for chromatic dispersion in the optical domain, as used in the prior art. At the transmitter end 10, the output 11 of a laser (not shown) is modulated by incoming data for transmission through a fiber channel 20. As described earlier, with the optical signal passing through the fiber medium, chromatic dispersion introduces a frequency dependent delay on the signal. This dispersion makes the received signal much harder to detect once dispersion delay becomes comparable to the bit period.

The most common dispersion compensation technique is to use a dispersion compensation fiber 21. A length of this highly dispersive fiber is inserted at the receiving end, between the end of channel 20 and an optical amplifier, if needed, and power detector 22. The purpose of the dispersive fiber is to add frequency dependent delay opposite to that applied by the fiber in the channel 20. The power detector 22 is then followed by a Trans-Impedance Amplifier (TIA) 23 and a threshold detector 24 before the signal is further distributed to its expected destination. Unfortunately, as indicated previously, the use of a dispersive fiber introduces attenuation and does not have the capability of adjusting the dispersion compensation once installed.

The chromatic dispersion compensation technique of the present invention compensates for chromatic dispersion in the electrical domain rather than in the optical domain. That is, the compensation is done post detection rather than before the received signal is passed through the power detector. This eliminates the need to use highly dispersive fibers, which can be difficult to tune and install. More importantly, because this technique can be quickly adjusted to compensate for changing dispersion, it enables the use of photonic switches which can re-direct signals to fiber channels having different chromatic dispersion characteristics.

Figure 2:
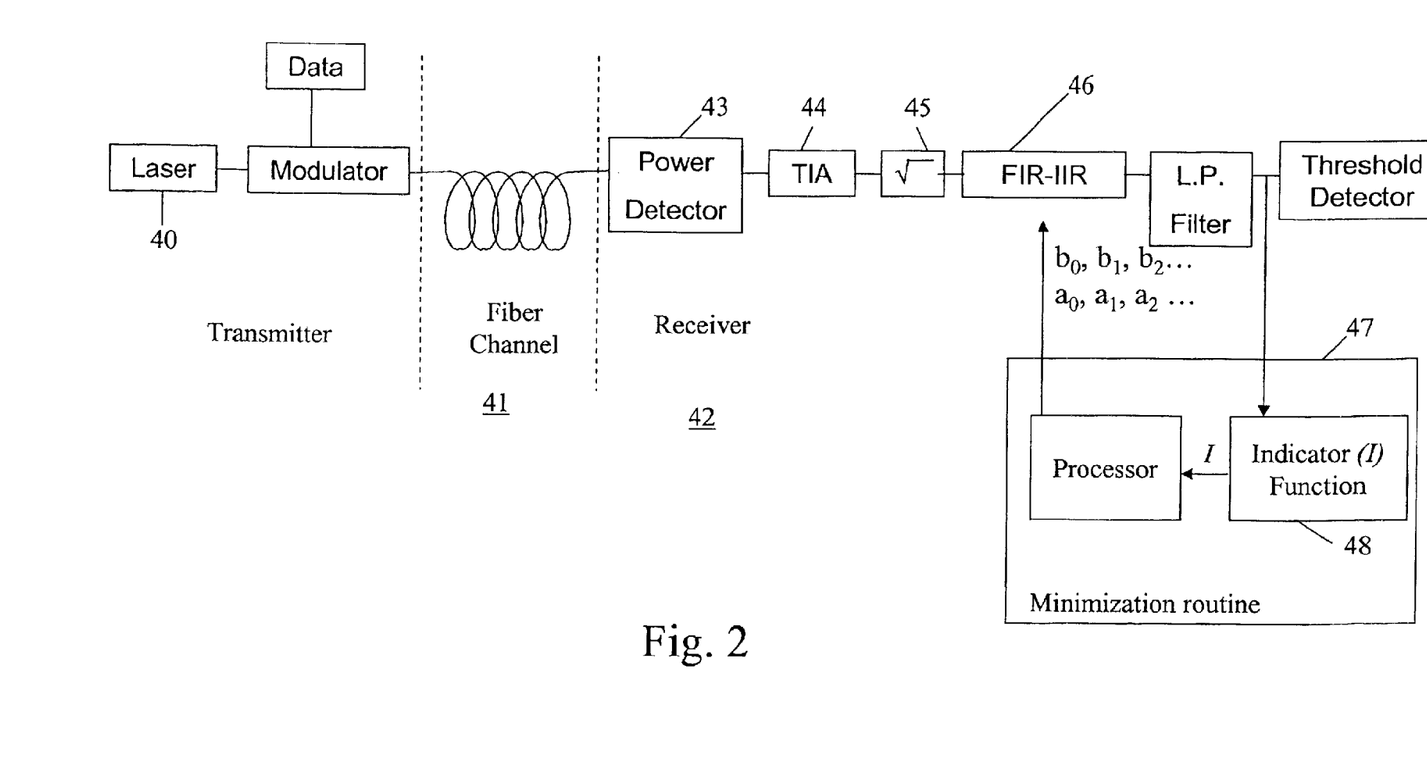
FIG. 2 is a block diagram illustrating the chromatic dispersion compensation technique of the present invention.

In order to derive the solution illustrated in FIG. 2, we can identify that in a typical optical transmission network, the optical signal is an amplitude modulated signal prior to detection by the power detector. The spectrum of this signal contains a "carrier" at a typical laser frequency (eg. 193 THz for 1550 nm laser light) surrounded by upper and lower sidebands. As the signal traverses the fiber, the higher frequencies travel faster than the lower frequencies (negative slopes are common too), causing the higher frequency components to have a shorter optical path than the lower frequencies. The amount of delay relative to the optical carrier that each frequency component experiences is expressed by $$\tau = -DL\frac{\lambda_0^2}{2\pi c}(\omega - \omega_0) \tag{1}$$

wherein
D is the dispersion
L is the length of the fiber
$\lambda_0$ is the wavelength of the optical carrier
c is the speed of light
$\omega_0$ is the frequency of the optical carrier
$\omega$ is the frequency of the Fourier component The propagation through the optical fiber can be described by the propagation term $e^{j\beta L}$ with $\beta=\pi\tau f$. To describe the effects of dispersion, each Fourier term is multiplied by the relative phase factor:

$$\phi_{dispersion} = \exp\left[-jDL\frac{\lambda_0^2}{4\pi c}(\omega - \omega_0)^2\right] \tag{2}$$

This is the phase factor that the prior art optical dispersion compensation methods nullify in the optical domain. Note that the magnitude of the phase factor is unity, which means that traversing a fiber with this idealized chromatic dispersion has no effect on the power spectrum of the optical signal.

The power detector illustrated in FIG. 1 usually comprises an instantaneous power detector followed by a low pass filter. This acts as a time domain envelope power detector, i.e., the output is the average power of the optical signal at that particular time. The output is usually band limited to a frequency comparable to the bit rate. Generally only the data for a particular WDM wavelength is present at detection (the others being filtered off by WDM bandpass filters). The detector signal is then given by the square of the magnitude of the time domain received optical signal envelope:

$$I_{PIN}=|E'(t)|^2=|\int e^{j\omega t}E(\omega)e^{jF}d\omega|^2 \tag{3}$$

where $$F = DL\frac{\lambda_0^2}{4\pi c}\omega^2.$$

Or equivalently:

$$I_{PIN}=[\int e^{j\omega t}E(\omega)e^{jF}d\omega\perp\int e^{j\omega t}E*(\omega')e^{-jF}d\omega'] \tag{4}$$

E(t) is real, so the negative frequency components of E($\omega$) must be the complex conjugate of the positive frequency components: $E^*(\omega)=E(-\omega)$. Note also that F contains the square of $\omega$ and $F(-\omega)=F(\omega)$. Using these properties and making a change of variables in the second integral: $\omega=-\omega'$ results in $$I_{PIN} = \left[\int e^{j\omega t}E(\omega)e^{jF}d\omega\right]\left[\int e^{j\omega t}E(\omega)e^{-jF}d\omega\right] \tag{5}$$

$$= \frac{1}{4}\left[\int e^{j\omega t}E(\omega)(e^{jF} + e^{-jF})d\omega\right]^2 - \frac{1}{4}\left[\int e^{j\omega t}E(\omega)(e^{-jF} - e^{jF})d\omega\right]^2 \tag{6}$$

$$= \left[\int e^{j\omega t}E(\omega)\cos F d\omega\right]^2 + \left[\int e^{j\omega t}E(\omega)\sin F d\omega\right]^2 \tag{7}$$

Equation 7 gives the current in the PIN diode which must be real and positive (this is easily seen from Equation 3). As this must be true for any E(t), each of the two terms in Equation 7 must be real and positive.

In the integral of the second term of Equation 7, the zero frequency component of E($\omega$) is multiplied by zero regardless of the amount of dispersion applied. The average value of the integral is therefore equal to zero. When the integral is squared, the sign of the integral is lost and would seem unrecoverable.

As the average value of the second term is zero, the entire DC component of the time waveform must come from the first term. In the first term of Equation 7, the DC component is unaltered regardless of the amount of dispersion. It should therefore be possible to decrease the AC component sufficiently to ensure that the integral always remains positive. Practically one can do this by decreasing the extinction ratio. It would therefore be possible to reconstruct the first integral from its square simply by taking the square root. Provided the second term is not too big, one can thereby get an estimate of the original signal by considering the contribution from the first term only.

By solving the first term in Equation 7 for E(t), we obtain:

$$E(t) = \int e^{j\omega t}\int e^{-j\omega t}\frac{\sqrt{I_{PIN}}}{\cos F}dtd\omega \tag{8}$$

The estimate can therefore be obtained by applying the transfer function in Equation 9 to the square root of the PIN diode current.

$$\sec\left[DL\frac{\lambda_0^2}{4\pi c}\omega^2\right] \quad (9)$$

Equation 7 therefore contains a recoverable component and a component which is not directly recoverable.

The sec function goes to infinity at $$\frac{\pi}{2} + n\pi$$

where n is an integer. In practice, one would cap the size of the sec function perhaps to a value comparable to the signal to noise ratio. The parts of the spectrum within these capped regions would not be easily retrievable. In practice however, these regions are small and the time domain signal can be suitably reconstructed from the remaining parts of the spectrum.

Referring to FIG. 2, data to be transmitted modulates the output of laser 40 before being sent over the fiber channel 41 as before. However, at the receiver 42, the received optical signal is converted to an electrical signal by means of a power detector 43 and trans-impedance amplifer (TIA) 44. The power detector 43 can be a PIN detector, avalanche detector, etc. Other types of power detectors may be used without changing the scope of the present invention. In one aspect of the invention, the transmitted data can be recovered from the electrical signal by applying a square root function 45 and the transfer function of Equation 9 (implemented as a Finite Impulse Response Infinite Impulse Response (FIR-IIR) filter, also called Auto Regressive Moving Average (ARMA) filter 46). As will be described further below, the coefficient set for a particular dispersion-length product (DL) can be calculated directly from Equation 9. This is done for a range of lengths and can be stored in memory for use later by the FIR-IIR filter.

Figure 3:
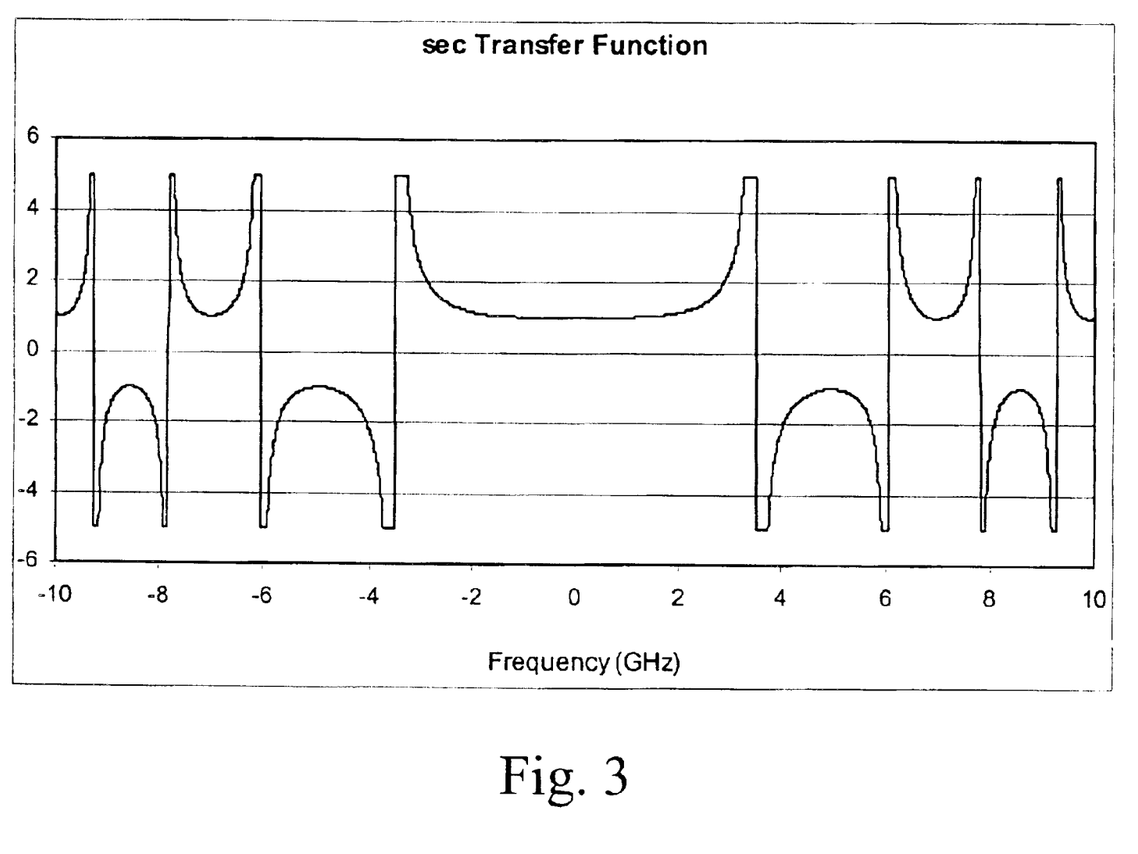
FIG. 3 is a diagram of the transfer function used for recovering the transmitted signal.

An example of this transfer function for a dispersion of 17 ps/nm/km over a length of 300 km is shown in FIG. 3. The transfer function shown (calculated from Equation 9) need only be reproduced out to a limited frequency. For 10 GB/s, the transfer function need only extend from approximately −8 GHz to +8 GHz.

The first approximation of the output (an estimate of E(t)) derived from the embodiment shown in FIG. 2 is not always sufficient to provide Bit Error Ratio (BER) performance consistent with the needs of an optical channel with Forward Error Correction (FEC). However, once this first approximation of the output is obtained, one can construct an estimate of the components which are not directly recoverable (the second term in Equation 7), subtract this estimate from the signal and re-apply the transfer function of Equation 9. This procedure results in a much improved BER.

The estimate of the second term in Equation 7 is obtained by applying the transfer function in Equation 10 to the first approximation of the output (an estimate of E(t)—the inverse Fourier transform of E(ω)) and squaring the result. It is sometimes useful to apply threshold detection (slicer) to the E(t) estimate before applying Equation 10 as this gives a better estimate of E(t) and reduces the feedback noise.

$$\sin\left[DL\frac{\lambda_0^2}{4\pi c}\omega^2\right] \quad (10)$$

Figure 4:
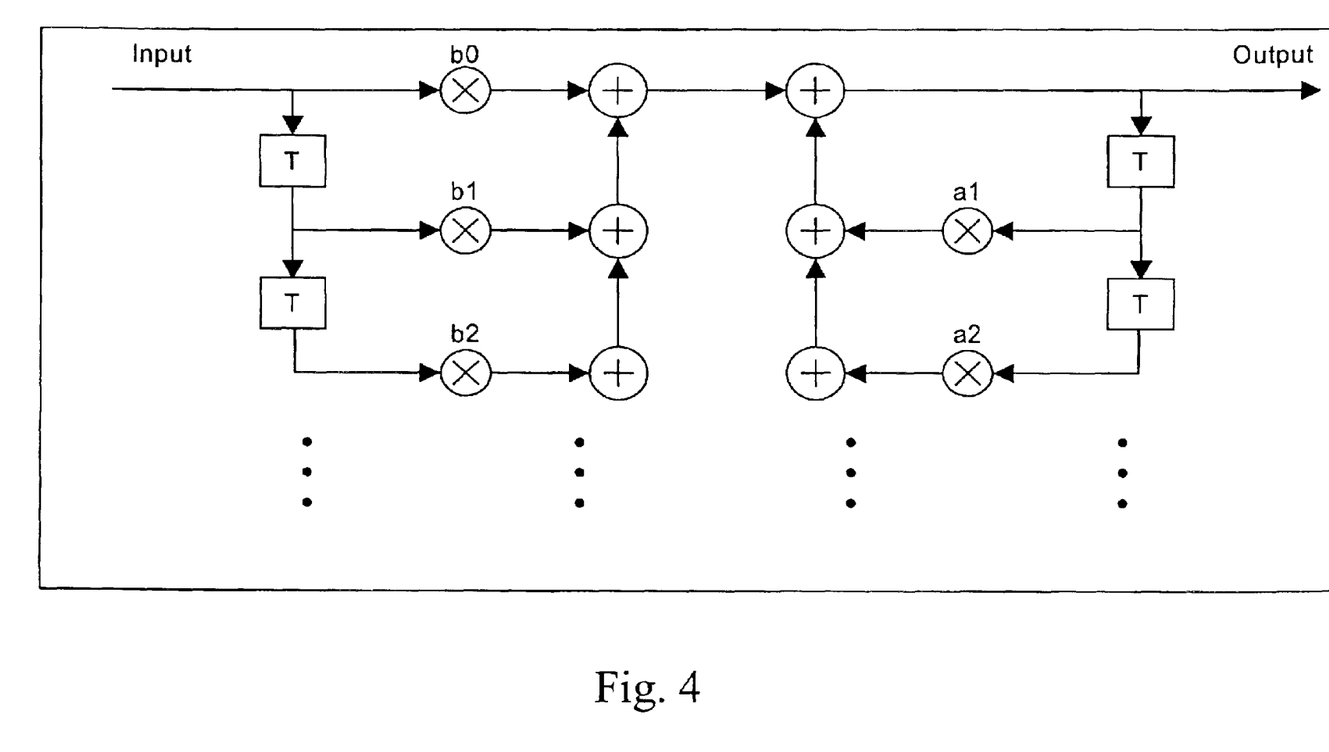
FIG. 4 is a block diagram illustrating a hardware implementation of the transfer function of FIG. 3.

The transfer functions of Equations 9 and 10 can be implemented in the form of a FIR-IIR filter using the circuit topology shown in FIG. 4. The effective transfer function applied by the circuit topology of FIG. 4 is given in Equation 11

$$H(z) = \frac{b_0 + b_1 z^{-1} + b_2 z^{-2} + b_3 z^{-3} + b_4 z^{-4}}{1 + a_1 z^{-1} + a_2 z^{-2} + a_3 z^{-3} + a_4 z^{-4}} \quad (11)$$

The frequency response can be obtained by setting $z=e^{2\pi j f}$ (where $j=\sqrt{-1}$) and then directly compared to Equations 9 and 10. The filter coefficients (a's and b's) for each of the two transfer functions should be adjusted such that the function of frequency given by Equation 11 closely matches that of its appropriate transfer function Equation 9 or 10. Those skilled in the art will recognize that a number of techniques can be used to achieve an appropriate match.

Once the calculated coefficients are applied the resulting signal can be further improved by using optimization algorithms to fine tune the coefficients.

Figure 5:
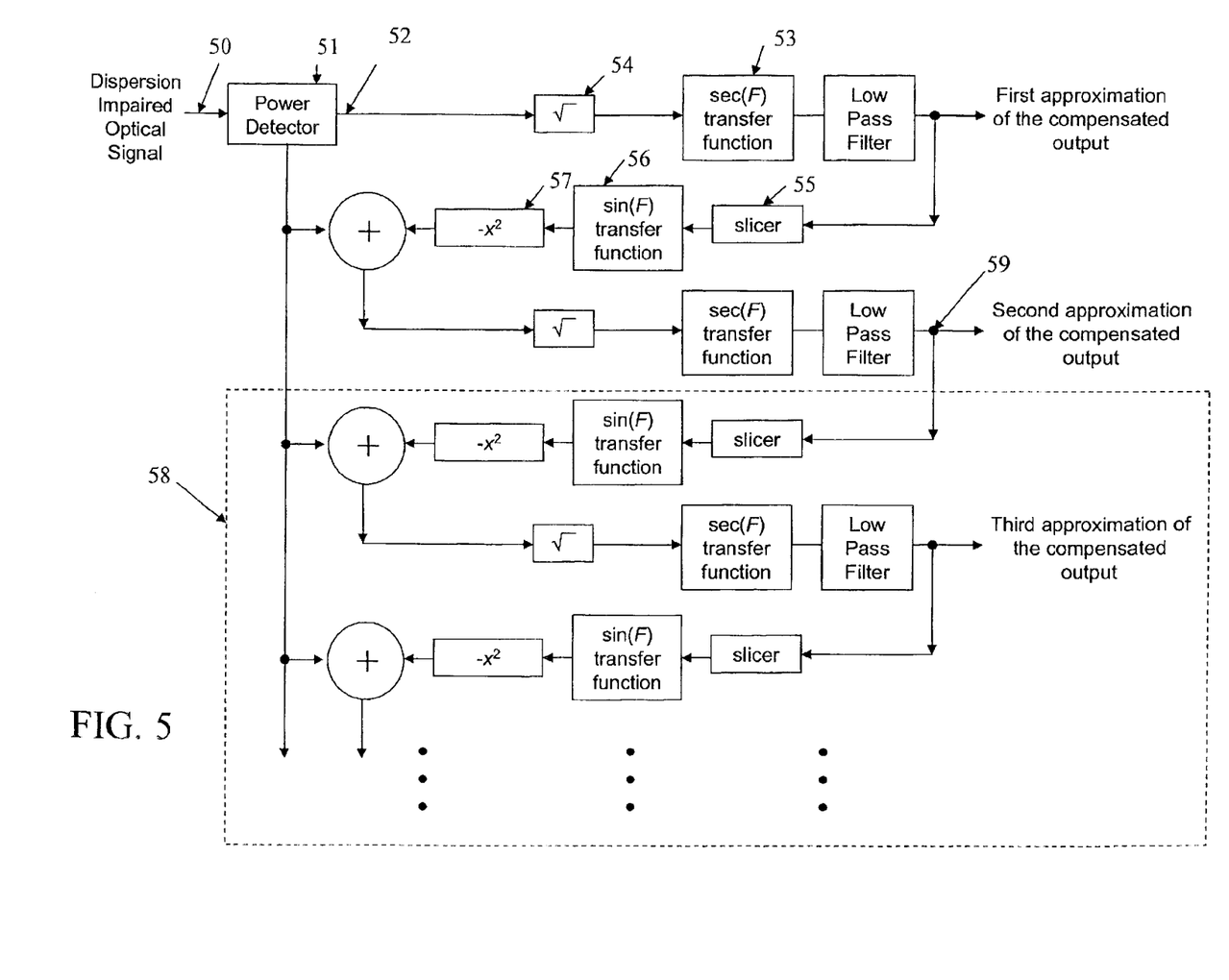
FIG. 5 is a diagram of an improved chromatic dispersion compensator according to the preferred embodiment of the invention.
Figure 6:
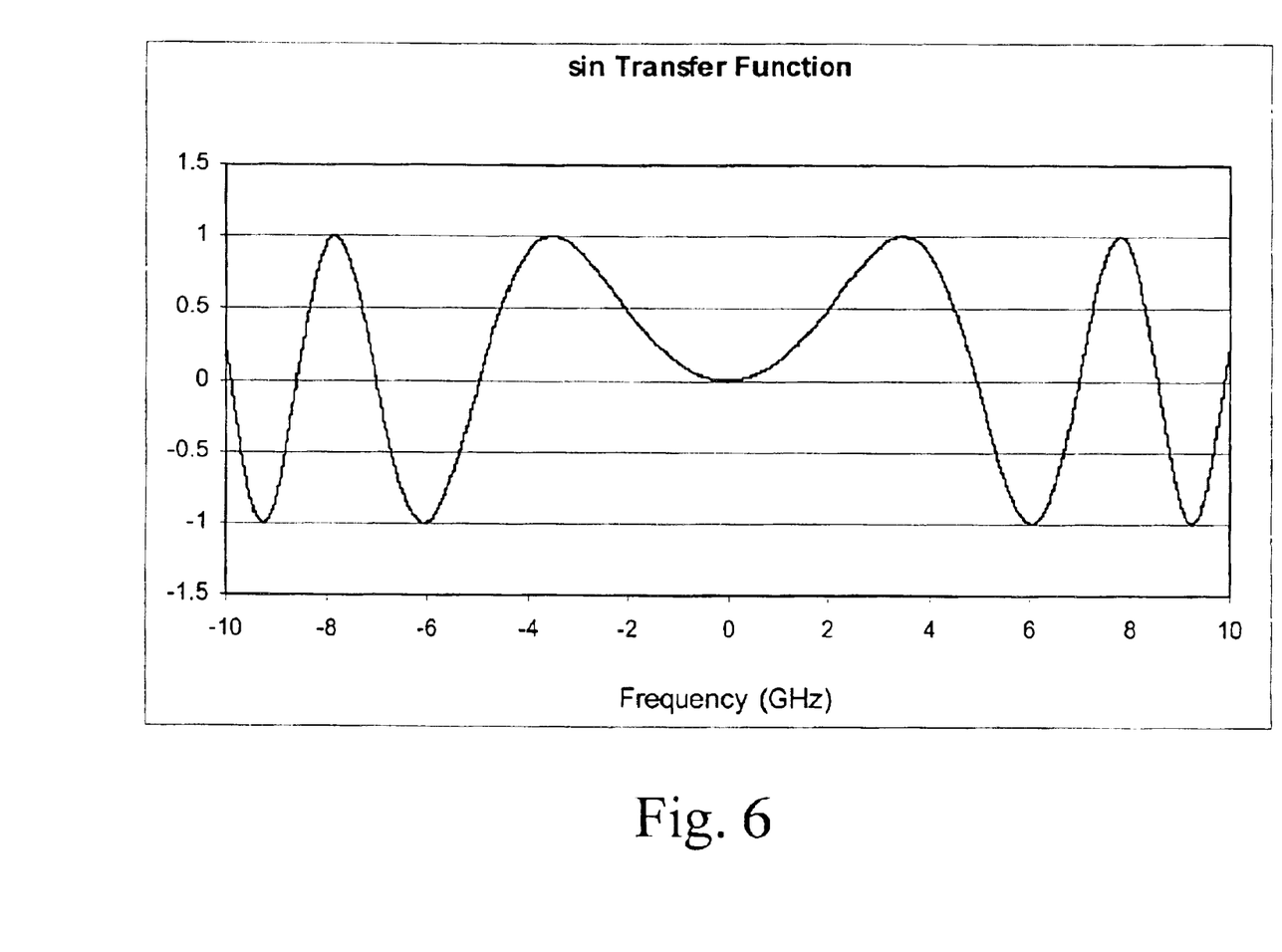
FIG. 6 is a diagram of the sin(F)transfer function used to generate the correction term for recovering the transmitted signal according to the preferred embodiment of the present invention shown in FIG. 5.

The procedure described above to derive the output is implemented in the topology of FIG. 5. In FIG. 5, the dispersion impaired optical signal 50 is received at a power detector 51 or PIN diode detector. The output 52 of the power detector 51 represents the square of the magnitude of the time domain optical signal envelope. The transfer function (Equation 9) is then applied 53 to the square root 54 of the output 52 of the PIN diode. This provides the estimate of E(t) to which is applied a threshold detector or slicer 55. Although not needed, in some cases the slicer can provide a better estimate of E(t) and can reduce feedback noise. An estimate of the second term in Equation 7 is then derived by applying the transfer function 56 (Equation 10) to the output of slicer 55 and substracting the square of the result 57.

In principle, one can apply the same procedure again (see box 58), using the result of the second approximation 59 as the new estimate of E(t). However, in practice, one-iteration is usually adequate to provide a sufficiently high Q result.

Figure 7A:
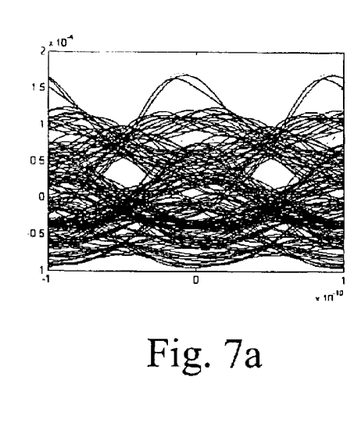
FIGS. 7a and 7b are illustrations of eye diagrams for uncompensated and compensated received data signals respectively.
Figure 7B:
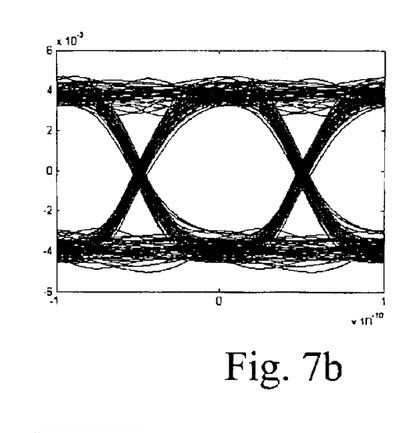

An example of the benefits of using the transfer function of FIG. 3 is illustrated by comparing the eye diagrams of FIGS. 7a and 7b. In FIG. 7a, we have shown an illustration of uncompensated data in the form of an eye diagram. This eye diagram represents the effects of chromatic dispersion on data at a distance of 250 km for a bit rate of 10 Gb/s with a 17 ps/nm/km fiber. This level of distortion makes the recovery of a signal at this distance essentially impossible unless chromatic dispersion compensation is put in place. In fact, at 10 GB/s with a fiber of 17 ps/nm/km, once the fiber length reaches about 120 km (when derived from Equation 1 this corresponds to a delay of 1.3 bit periods for the maximum frequencies in the modulation signal) reproduction of the transmitted signal becomes essentially unmanageable.

FIG. 7b shows a recovered data eye diagram when the preferred embodiment of the invention as shown in FIG. 5 is applied to the received signal.

Figure 7C:
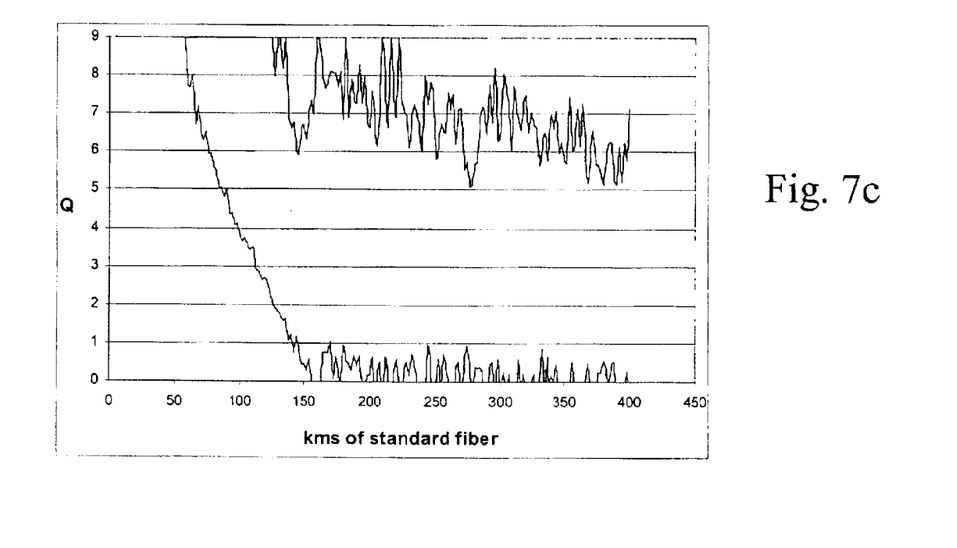
FIG. 7c is a chart of the Q versus distance.

FIG. 7c shows the results of a simulation that predicts the Q of the signal recovered using the preferred embodiment of the invention as shown in FIG. 5. In this chart, the Q was determined every km from 50–400 km under the following conditions:

| | |
|---|---|
| Number of bits: | 1024 |
| Samples per bit | 16 |
| Bit rate: | 10 GB/s |
| Fiber dispersion: | 17 ps/nm/km |

-continued

| | |
|---|---|
| Optical level at the PIN detector: | −10 dBm |
| Noise in the receiver: | 12 pA/rt.Hz |
| Extinction Ratio: | 8 dB |
| Detector: | simple threshold |

The upper curve is the result of applying the transfer function implemented by the circuit topology of the preferred embodiment of the invention as shown in FIG. 5, the lower curve represents the result if no compensation is applied.

The optimization criterion can be based on Q, BER, or a number of other signal quality indicators. Ideally, the BER is related to Q as follows:

$$BER = \frac{1}{2}\text{erfc}\left(\frac{Q}{\sqrt{2}}\right) \quad (12)$$

If the dispersion characteristics in a channel were not known, the secant argument in Equation 9 would also be unknown and recovery would not be feasible. For example, if a new fiber channel is installed or modified or if a signal is switched over to a new fiber network topology, the chromatic dispersion must be derived in order to properly compensate its effect. Indicators such as the Q of the signal, or the BER can also be used to find the optimum coefficient set.

If the dispersion were incorrect, the peaks in the secant function would multiply parts of the spectrum that would not have the corresponding nulls from the sideband interference. This would produce large components of sinusoids at those frequencies. This suggests that the time averaged excursion of the signal from its mean value would be an indicator of the proper secant argument. If the indicator value is given by I, and the analog signal after application of the transfer function assuming a value of DL is x(t):

$$I(DL) = \langle |x(t) - \overline{x(t)}| \rangle \quad (13)$$

Figure 8:
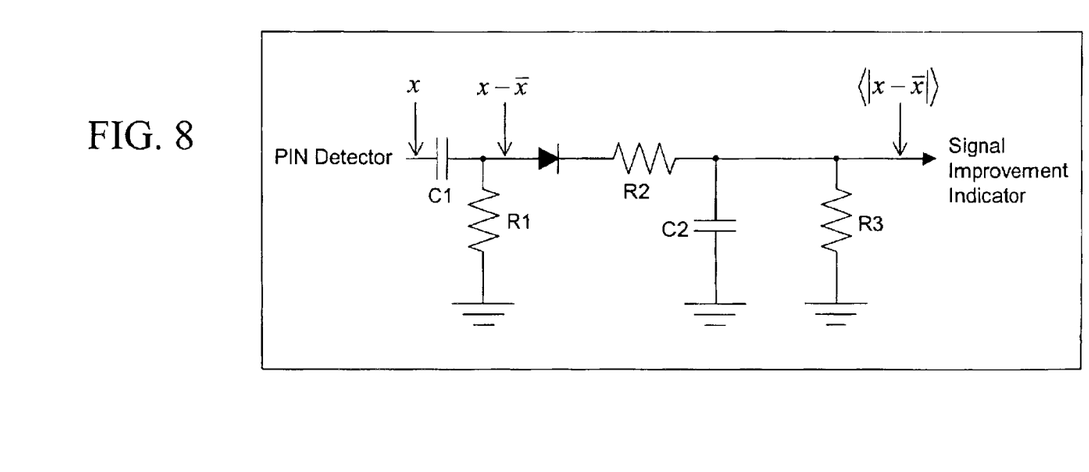
FIG. 8 is a simplified circuit for providing the Indicator I(DL)
Figure 9:
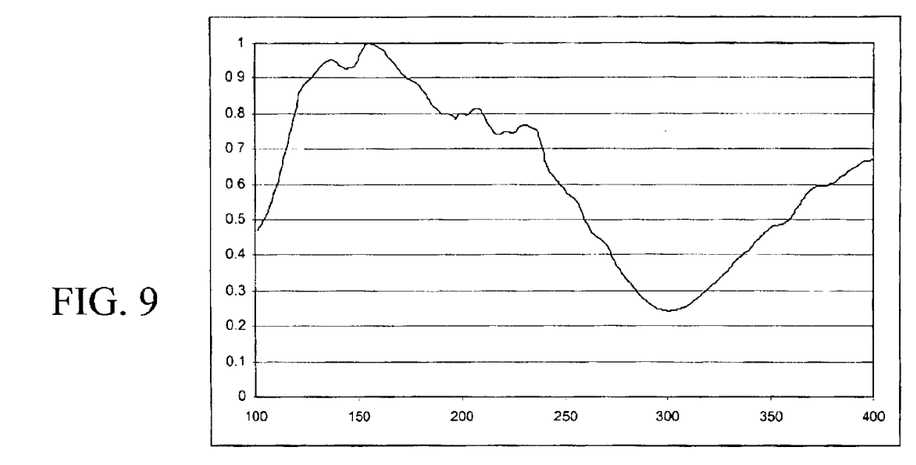
FIG. 9 is a graph illustrating the values of the Indicator I(DL) for various assumed fiber lengths with actual length at 300 km of 17 ps/nm/km fiber.

This is relatively easy to implement as illustrated by the circuit topology of an indicator (I) circuit shown in FIG. 8. At the proper value of the argument, the indicator goes to a minimum (i.e. when DL in Equation 9 becomes equal to the product of the length of fiber in the channel (L) and the fiber dispersion (D) Values of the indicator for various coefficients sets are plotted in FIG. 9. The coefficients are plotted as appropriate for various lengths of 17 ps/nm/km fiber. The data actually traversed 300 kms of 17 ps/nm/km fiber. Therefore, by scrolling through coefficient sets appropriate for various values of DL, the actual DL can be determined by minimizing the value of the indicator. This, in turn determines an appropriate set of coefficients to use for the dispersion compensation. Another advantage of using the minimization routine described above is that it can also be used as a diagnostic tool, i.e. the technique can be used for measuring chromatic dispersion. For example, testing spools of fiber once they leave the factory would determine the chromatic dispersion characteristics of the fiber.

It will be well known to those knowledgeable in the art that the embodiments presented above can be implemented in software.

I claim:

1. A method of producing an output, compensated for chromatic dispersion of an optical signal, comprising the steps of:
   a) converting said optical signal to an electrical signal, said electrical signal comprising components which are recoverable and components which are not directly recoverable;
   b) obtaining a first approximation of the output from the recoverable components by multiplying the spectrum of said electrical signal by a factor derived from its frequency;
   c) using said first approximation, estimating and removing the components of said electrical signal which are not directly recoverable;
   d) obtaining more accurate approximations of the compensated output by re-applying step b) iteratively.

2. A method as defined in claim 1, wherein said step of multiplying the spectrum of said electrical signal by a factor derived from its frequency is described by applying a transfer function represented by $$\sec\left[DL\frac{\lambda_0^2}{4\pi c}\omega^2\right]$$

where
   D is the dispersion
   L is the length of the fiber
   $\lambda_0$ is the wavelength of the light source
   c is the speed of light
   ω is the frequency of the Fourier component 3. A method as defined in claim 1, wherein said step of estimating the components of said electrical signal which are not directly recoverable is achieved by applying a transfer function represented by $$\sin\left[DL\frac{\lambda_0^2}{4\pi c}\omega^2\right]$$

to said first approximation and squaring the result.

4. A method as defined in claim 1, wherein the extinction ratio of said optical signal is sufficiently small to allow suitable recovery of the recoverable components.

5. A method as defined in claim 2, further comprising the step of modifying said electrical signal by introducing a square root non-linear element prior to application of said transfer function.

6. A method as defined in claim 4, wherein said sufficiently small extinction ratio is present in said optical signal prior to transmission.

7. A method as defined in claim 2, wherein said transfer function is implemented by means of an FIR-IIR filter.

8. A method as defined in claim 3, wherein said transfer function is implemented by means of an FIR-IIR filter.

9. A method as defined in any of the aforementioned claims, wherein said compensation method is implemented in software.

10. A method as defined in claim 1, wherein said transfer function is used as a diagnostic tool for measuring the chromatic dispersion characteristics of an optical channel.

11. An apparatus for producing an output, which compensates for chromatic dispersion of an optical signal, comprising:
    a) means for converting said optical signal to an electrical signal, said electrical signal comprising components which are recoverable and components which are not directly recoverable.
    b) means for obtaining a first approximation of the output from the recoverable components by multiplying the spectrum of said electrical signal by a factor derived from its frequency;
    c) means for estimating and removing the components of said electrical signal which are not directly recoverable using said first approximation;

d) means for obtaining a second and further approximations of the compensated output by iteratively re-applying the output of c) to element b).

12. An apparatus as defined in claim 11, wherein said means for multiplying the spectrum of said electrical signal by a factor derived from its frequency is implemented by the application of a transfer function represented by $$\sec\left[DL\frac{\lambda_0^2}{4\pi c}\omega^2\right]$$

where

D is the dispersion

L is the length of the fiber $\lambda_0$ is the wavelength of the light source c is the speed of light $\omega$ is the frequency of the Fourier component 13. An apparatus as defined in claim 11, wherein said means for estimating the components of said electrical signal which are not directly recoverable is implemented by the application of a transfer function represented by $$\sin\left[DL\frac{\lambda_0^2}{4\pi c}\omega^2\right]$$

to said first approximation and squaring the result.

14. An apparatus as defined in claim 11, wherein the extinction ratio of said optical signal is sufficiently small to allow suitable recovery of the recoverable components.

15. An apparatus as defined in claim 12, further comprising means for modifying said electrical signal by introducing a square root non-linear element prior to application of said transfer function.

16. An apparatus as defined in claim 14, wherein said sufficiently small extinction ratio is present in said optical signal prior to transmission.

17. An apparatus as defined in claim 12, wherein said transfer function is implemented by means of an FIR-IIR filter.

18. An apparatus as defined in claim 13, wherein said transfer function is implemented by means of an FIR-IIR filter.

19. An apparatus as defined in any of the aforementioned claims, wherein said compensation apparatus is implemented in software.

20. A apparatus as defined in claim 11, wherein said transfer function is used as a diagnostic tool for measuring the chromatic dispersion characteristics of an optical channel.

* * * * *

UNITED STATES PATENT AND TRADEMARK OFFICE
CERTIFICATE OF CORRECTION

PATENT NO. : 6,829,549 B2
DATED : December 7, 2004
INVENTOR(S) : Andro Van Schyndel It is certified that error appears in the above-identified patent and that said Letters Patent is hereby corrected as shown below:

Column 4,
Line 6, delete "$I_{PIN}=|E'(t)|^2=|\int e^{j\alpha x} E(\omega)e^{jF}d\omega|^2$" and insert
--$I_{PIN} = |E'(t)|^2 = |\int e^{jwt} E(\omega)e^{jF}d\omega|^2$--.

Line 16, delete "$I_{PIN}=[\int e^{j\alpha x} E(\omega)e^{jF} d\omega \perp \int e^{j\alpha x}E^*(\omega')e^{jF} d\omega']$" and insert
--$I_{PIN} = [\int e^{j\omega t} E(\omega)e^{jF} d\omega \perp \int e^{-j\omega'\tau} E^*(\omega')e^{-jF} d\omega']$--.

Column 6,
Line 9, delete "$z=e^{2mf}$" and insert -- $z=e^{2\Pi jf}$ --.

Signed and Sealed this

Tenth Day of May, 2005

JON W. DUDAS
*Director of the United States Patent and Trademark Office*